United States Patent [19]

Mazzei et al.

[11] Patent Number: 4,917,304

[45] Date of Patent: Apr. 17, 1990

[54] AUTOMATIC CONTROLLER FOR INJECTION OF ADDITIVES INTO IRRIGATION WATER

[75] Inventors: Angelo L. Mazzei, Bakersfield; Jim Wearin; Joseph E. Figgs, both of Fresno, all of Calif.

[73] Assignee: Avanti Manufacturing Co., Bakersfield, Calif.

[21] Appl. No.: 290,879

[22] Filed: Dec. 21, 1988

Related U.S. Application Data

[63] Continuation of Ser. No. 948,369, Dec. 31, 1986, abandoned.

[51] Int. Cl.$^4$ ............................................. A01C 23/04
[52] U.S. Cl. ........................................ 239/64; 239/69; 239/70; 239/304; 239/727
[58] Field of Search ............................. 239/64, 67-70, 239/303-305, 310, 414, DIG. 15, 727

[56] References Cited

U.S. PATENT DOCUMENTS

| | | | |
|---|---|---|---|
| 2,905,117 | 9/1959 | Dugan | 111/7 |
| 4,015,366 | 4/1977 | Hall | 239/69 X |
| 4,121,767 | 10/1978 | Jensen | 239/310 X |
| 4,456,176 | 6/1984 | Agius | 239/142 |
| 4,545,396 | 10/1985 | Miller et al. | 239/64 X |
| 4,626,984 | 12/1986 | Unruh et al. | 239/69 X |
| 4,635,848 | 1/1987 | Little | 239/310 X |
| 4,708,162 | 11/1987 | Bayat | 239/70 X |

FOREIGN PATENT DOCUMENTS

| | | | |
|---|---|---|---|
| 2515839 | 5/1983 | France | 239/69 |
| 406518 | 6/1974 | U.S.S.R. | 239/69 |

*Primary Examiner*—Andres Kashnikow
*Attorney, Agent, or Firm*—Donald D. Mon; David O'Reilly

[57] ABSTRACT

An injection control system selectively to activate circuitry for controlling injection of additive chemicals into an existing automatically timed irrigation system having an irrigation timer. This control system includes a plurality of storage reservoirs for storing one or more additives. Conduits deliver these additives to the existing irrigation system. The control system includes a central processor programmed for intended operation, and sensors sensing the flow condition valves in the existing irrigation system. The control system thereby controls supply of additives during the operation of the existing system.

12 Claims, 3 Drawing Sheets

AUTOMATIC CONTROLLER FOR INJECTION OF ADDITIVES INTO IRRIGATION WATER

This is a continuation of co-pending application Ser. No. 948,369 filed on Dec. 31, 1986, now abandoned.

FIELD OF THE INVENTION

This invention relates to irrigation systems and more particularly relates to irrigation systems programmed to inject additives such as fertilizers and chemicals into irrigation injection water.

BACKGROUND OF THE INVENTION

It is known to provide an irrigation system with a timer which controls valves to deliver irrigation water at preselected times and controlled rates to fields. The term "irrigation" includes the supply of water through open trenches, through conduitry to supply them, to sprinkler systems and drip systems, and generally to all types of flow in which the time and duration of water supply, and the amount and time of injection of additives is a feature. The total volume of water is controlled by setting the on and off times of the timer controlling the particular valve. Timers which can selectively control and operate several sprinkler or irrigation systems are known for remotely controlling the on and off times of a plurality of valves selectively to irrigate different areas or fields at different times, because the available water capacity and pressure usually only allows irrigation through a limited number of outlets at any one time. Thus, to cover a large area, staggered irrigation times for selected areas are often required. Also, mobile systems sprinkle regions of varying shapes and areas, so that a mere off-on timer can not be expected to respond to its needs.

Agricultural chemicals are frequently applied separately from the main irrigation stream by machines or aircraft because of the limitations of the irrigation art. Presently, irrigation water cannot effectively be used as the carrier, even though important benefits are potentially available from such delivery. Examples of such benefits are reduction in the amount of chemicals needed, better utility of what is applied, reduction of labor costs, and certainty of the results.

Even more, some additives are not compatible for simultaneous mixing with other additives in the irrigation water. It is then necessary separately to inject these compounds. This is at the best a nuisance. It is evident that a time clock is an unsuitably simple device to control what is inherently a sophisticated application of chemicals, many of which represent hazards if applied in the wrong concentration or at the wrong time. For example, the supply of chemicals into the system when it is not in a flowing situation which will give an immediate slug of chemicals when the system is again opened to flow. Still, timers which relate to the day and to the time of day are an important and prevailing working tool for the agricultural industry.

An object of this invention is to provide an automatic controller for fertilizers and chemicals which operates in tandem with and is an adjunct to a basic irrigation timer. Since optimum injection of chemicals is directly related to the timing of the flow of water, the present invention relies upon and reads the valve-opening signals of the irrigation timer as input data and is programmed to activate injection only when a predetermined valve opening signal is recognized, and to close it otherwise.

The invention is also programmed to terminate a programmed injection event any time there is a malfunction of the basic irrigation timer or an identifiable failure of the irrigation distribution system or of the injection device.

Yet another object of the present invention is to provide a totally automated irrigation system for injecting additives into irrigation water which is programmable to control a number of injection devices sequentially, all at once or in any desired combination thereof.

The automated irrigation injection system of this invention controls the operation of relays to operate valves at selected times while simultaneously operating valves to inject additives into the flow of irrigation water (or not to do so if the program calls for it).

An additional object of the present invention is to react to supplementary signal to terminate the injection of additives upon the sensing of parameters such as loss of flow or low pressure. This system will still retain in its memory the pre-programmed schedule, and will resume operation after the problem which caused termination has been corrected. This system also permits manual termination of the injection of additives at any time.

BRIEF DESCRIPTION OF THE INVENTION

The automated control system of this invention is designed to control the time and injection of additives into irrigation water by selectively activating circuitry which controls injection devices or valves. The additives will generally be in liquid or slurry form, and may be such as insecticides, fertilizers, herbicides, water treatment chemical or any other chemicals. The system includes an auxillary controlling device that senses valve opening signals sent by a standard irrigation system controlled by a timer or computer to initiate injection of additives into the flow.

Agricultural additives are selectively delivered from storage means by sending appropriate output signals to respective devices which control the flow of the additives. The injection devices open the irrigation system to injection of the respective additives. Whenever the irrigation system is in a flow condition this system is available to provide the additive.

A programmable central processing unit (CPU) allows the system to be pre-programmed to perform a plurality of functions. In addition to injecting additives, the system can count the number of openings of an irrigation valve and activate the injection device after a predetermined number of irrigation sequences, thereby to enable a relatively complicated sequence of timings and applications to be accomplished. The processing unit can also be programmed to delay the injection of fertilizer or chemical for a period of time after the irrigation cycle begins so the additive will arrive at a desired time in view of the capacity of the system, and to terminate injection for period of time to accomplish flushing of the system before the main flow is stopped, if so desired.

The system is best designed to control four separate injection systems in pre-selected sequences, although any greater or lesser number of systems may be included instead. Most normal irrigation systems can be accommodated by a system of this scope. All injection systems can be operated simultaneously, sequentially or in any combination desired. Further, this system stores in memory the number of injections performed, which can be displayed. Each system can react to abnormal conditions such as loss of flow or low pressure to terminate the injection process when its injection would be disadvantageous. After restoration of normal operation the system will resume operation on the next scheduled event. The system is adapted to be interrupted and be put in a hold mode while programming new sequences. The system is also equipped to allow "next only" activation of selected injection to selected field valves.

Protection against power failures can be provided by utilizing electronically programmable read only memories (EEPROM) which store and retain the program until power is restored. Additionally output connector devices are provided so that a printed record of the injection events can be provided if desired.

The above and other features of this invention will be fully understood from the following detailed description and the accompanying drawings, in which:

DETAILED DESCRIPTION OF THE INVENTION

The automated control system of this invention is based on a micro-processor and controller designed to start and stop electrically actuated valves and devices which selectively inject additives into irrigation water. The system can be programmed to control the on-off timing of multiple output signals to energize relays or related controlled valves. These relays and valves will in turn activate the additive injection systems. The system can be programmed to inject the additives at preselected intervals for a predetermined time with automatic delays in the time before and after injection being provided.

Figure 1:
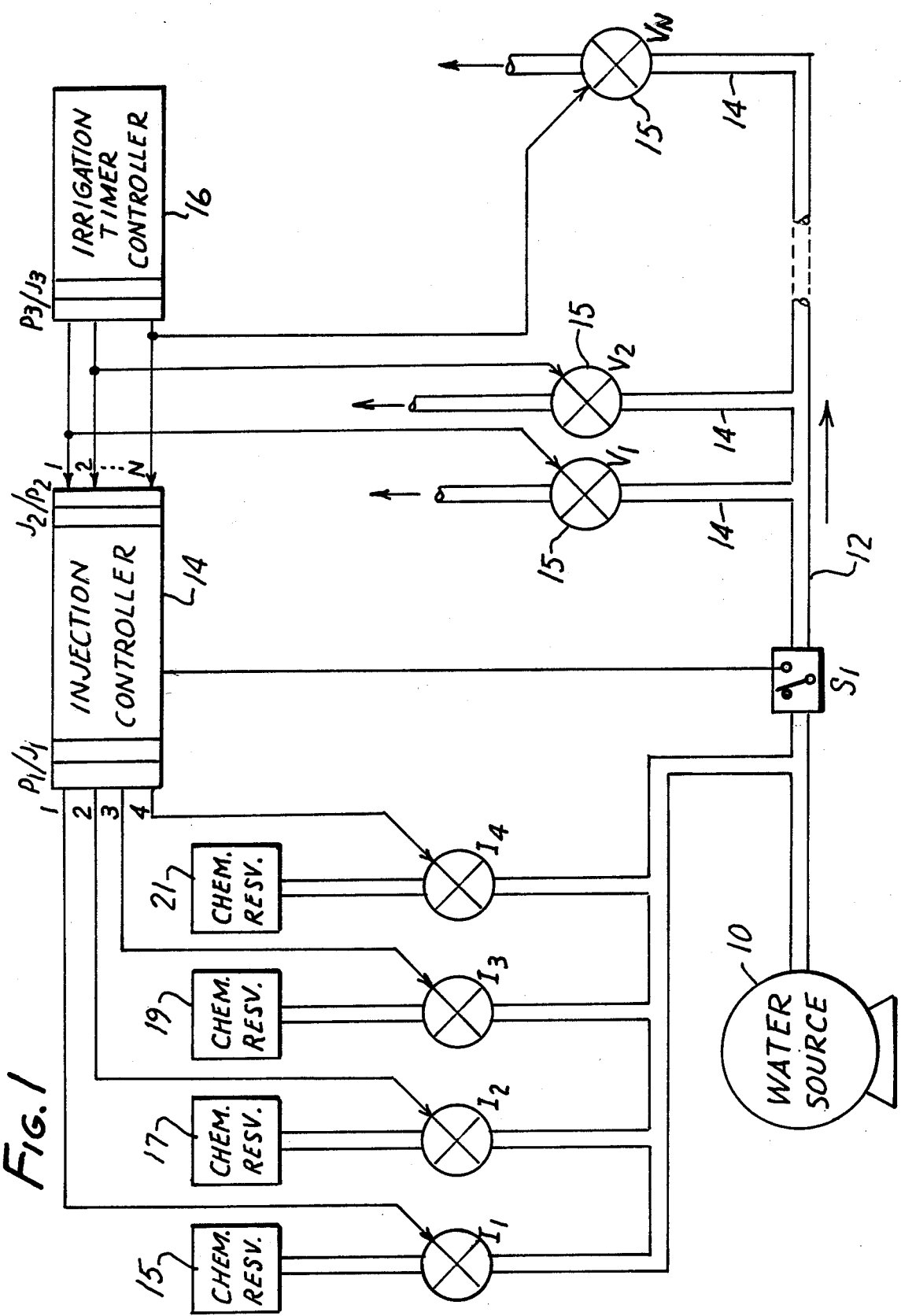
FIG. 1 is a block diagram of an automated irrigation system to control injection of fertilizers and chemicals.

An irrigation system according to the invention is shown in the block diagram of FIG. 1. Irrigation water is supplied to a plurality of valves 13 ($V_1$-$V_n$) from water source 10 through conduits 12 and 14. Valves 15 are selectively operated by irrigation timer controller 16 which may operate one or more of the valves in a predetermined sequence. The output of irrigation timer controller 16 is also sent to injection controller 14 having a central processing unit for receiving and storing outputs from injection timer controller 16. Thus, the particular valve and time of operation is received and stored in injection controller 14.

Injection controller 14 may also receive an output from fluid operated sensor or switch S1 to indicate start up of an irrigation cycle. Injection controller 14 being pre-programmed then activates injection valves or devices I1-I4 all at once or selectively. Thus, injection controller not only receives inputs indicating that an irrigation cycle has begun but also detects and stores information as to which of the valves V1-VN has been activated. According to the sequence programmed into injection controller 14 the particular fertilizer or chemical from one of resevoirs 15, 17, 19, 21 is injected by one operation of one or more of the injection devices or valves I1-I4.

The programming of the system is illustrated in the layout diagram (FIG. 2) of the control panel for the automatic injection control system. Three position switch 18 selects the operating mode of either "normal operation" or "program or stop/hold" (for programming or indefinite delay of application). The "next only" position is a spring-loaded momentary position and serves to place selected programs in an active mode during the very next opening of a selected valve.

The injection control system is designed to activate injection at a pre-programmed number of openings of irrigation field valves 18. The program responds to the output signal from standard irrigation timer control 16. When irrigation timer controller 16 opens one or more of irrigation field valves 18, injection controller 14 senses the output and identifies it as one of multiple input signals. Since injection of an additive may not be desired each time a field is irrigated, the injection controller is provided with the ability to count and store in memory each individual opening signal to one of the irrigation valves. Injection controller 14 as programmed then will only energize injection after a specified and variable number of openings of a given irrigation field valve.

Injection controller 14 also is programmable to provide a time delay to delay activation of injection of a fertilizer or chemical for a variable number of minutes after the irrigation valve is opened. Additionally, the duration of application at any time or after the delay period can also be controlled.

The central processing unit in injection controller 14 also is provided with the capacity to initiate separate outputs through plug P1 to injection devices I1-I4 so they can be activated simultaneously or in any sequence decided by the user. The central processor also stores the number of injections which have occurred per output and per irrigation valve for later retrieval if desired.

Injection controller 14 is supplied with an internal circuit which is normally closed to allow standard operation. One or more external sensors 13 can be attached to the controller. These normally closed sensors (i.e. flow switch high/low pressure switch, or soil moisture sensor, for example) when closed, provide continuity for standard operation. If any of these sensor switches opens, injection controller 14 will, after about a 10 second wait, terminate any active injection event. Injection controller will re-activate injection at the next scheduled event. If the situation causing the sensor opening, or any other sensor opening still exists, controller 14 will again terminate or prevent any active event and await the next scheduled event.

Additionally, the controller provides for manual cancellation of any application in process by movement of switch 18 to a "stop/hold" position. Returning switch 18 to "normal apply" allows controller 14 to initiate programmed injection at the next scheduled event.

Sensor or switch S1 also performs the function of providing "fault-interrupt" in the event there is a interruption of flow of irrigation water from source 10. In the event that flow stops or pressure substantially drops, a sensor such as flow sensing switch S1 sends a signal to the injection controller after about 10 seconds, the controller will cancel the injection of additive through devices I1-I4. Cancellation of a current injection event will not affect future schedules since injection controller 14 retains programming.

When a subsequently scheduled injection is due to operate, injection controller 14 will send signals to activate it. If the situation which caused cancellation is not remedied, injection controller 14 will again cancel. All such cancellations are memorized by controller 14 for informational retrieval. Additionally, the system provides for manual cancellation of any application in progress by operation of switch 18 to a "stop/hold" position allowing resumption of normal programming on the next scheduled event when switch 18 is re-positioned to a "normal apply" position.

Figure 2:
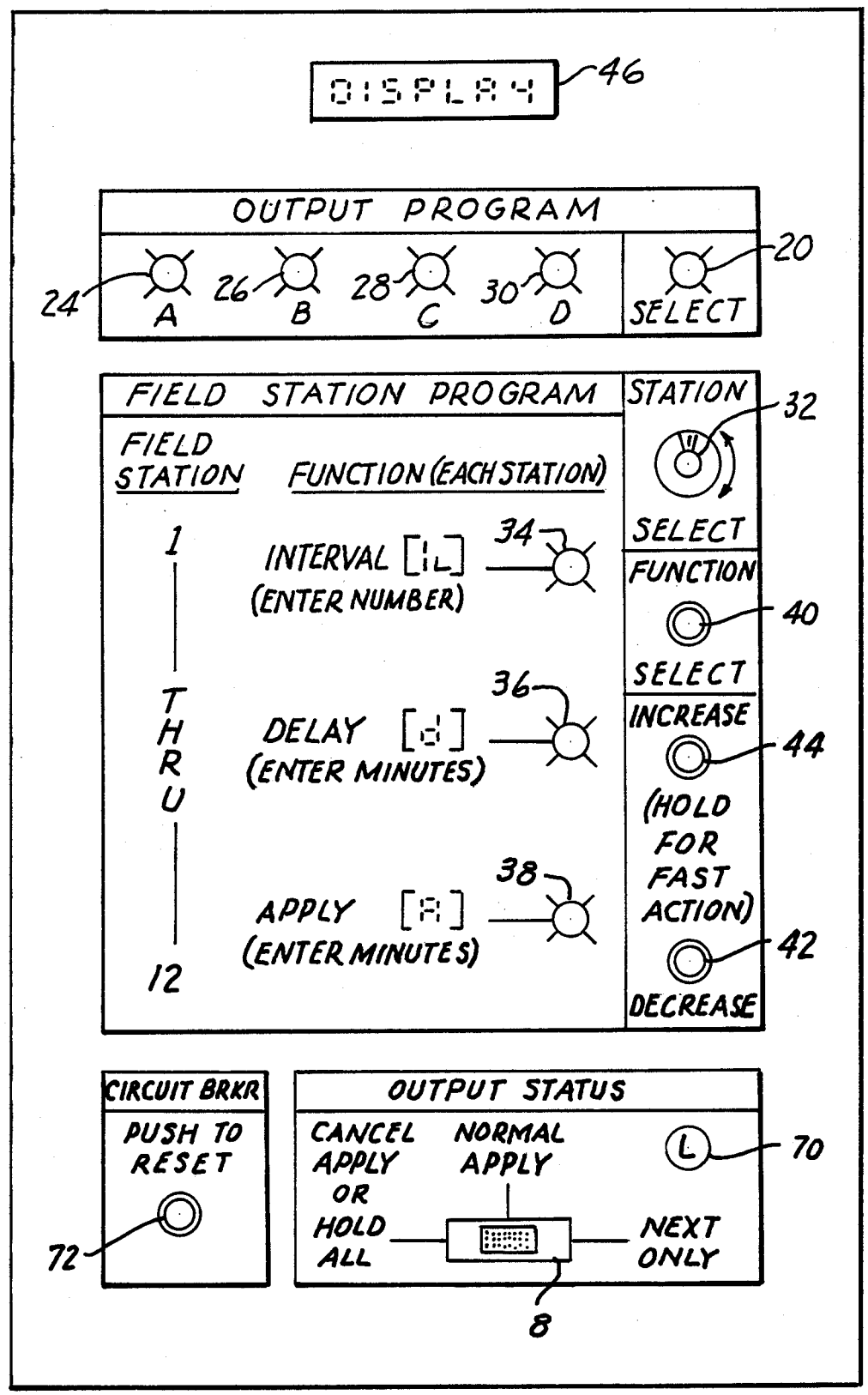
FIG. 2 is a schematic layout of the controls for programming the automated injection control system.

The panel and layout of FIG. 2 illustrates switch 18 which controls the operating status of the injection controller. The program or "stop/hold" position is used to place controller 14 in a non-output mode. Programming or program changes can be done only in this mode. As programming is completed, movement of switch 18 to "normal apply" places the injection controller in active or ready mode and any future program will activate as scheduled. The "next only" position of switch 18 is momentary and spring-loaded to return the switch to "normal apply". Movement of switch 18 to the "next only" position for a time of a few seconds will cause light 70 to illuminate. This indicates that an output program, chosen by use of switch 20 and a field station chosen by rotary switch 32, will activate injection the very next time that the chosen field station is signalled by irrigation timer instead of waiting for regularly scheduled activation.

Circuit breaker reset switch 72 resets the system should there be a power outage or the protected fuse or circuit breaker has been tripped. Since the programs are entered into an electronic programmable double read only memory (EEPROM) they will not be lost because of a power outage. Activation of switch 72 will reset the system putting the system in the normal mode.

For programming the system all injection and irrigation is put on a hold status by moving switch 18 to a "program or stop/hold" position which will stop or delay any injection until the system is returned to the "normal apply" mode. Previously scheduled or program schedules remain in the program memory. The "program or stop/hold" position of switch 18 is also for changing or entering a new program schedule. With appropriate connector (not shown) the control system illustrated in FIG. 2 can be connected to a separate printer to print out the details of each event such as date, time of day, program activated, irrigation valve effected and the time when the injection starts or ends.

For programming the system as indicated previously switch 18 is moved to the "program or stop/hold" position. This interrupts the presently programmed schedule so that it can be changed or a new program entered. With the output status of the irrigation system in the hold position, a program or schedule can be selected. A design for programming up to four injection devices for injecting up to four additives or combinations thereof is shown. Push button switch 20 sequentially selects program output A, B, C or D representing the four different chemical injection devices I1-I4 with the program selected indicated by one of indicator lights 24, 26, 28, or 30 illuminating.

Once a particular additive or program has been selected its operation can be programmed by operation of switches 34, 36, 38 in field station program section of the system. Rotary switch 32 selects the particular station (i.e. field valve or series of valves) to receive the additive from the program, selected. Up to 12 such fields are illustrated in FIG. 2, but there could be more. After selection of a particular field, the delay function, or length of application are selected by operation of function select switch 40. The function selected is indicated by lights 34 for interval, 36 for delay or 38 for apply duration. Activation of pushbutton function select switch 40 sequentially illuminates lights 34, 36, or 38 to select that function. Once a function is selected switch 42 is used to select a digit for programming and switch 44 is used to increase the value of a digit.

Figure 3A:
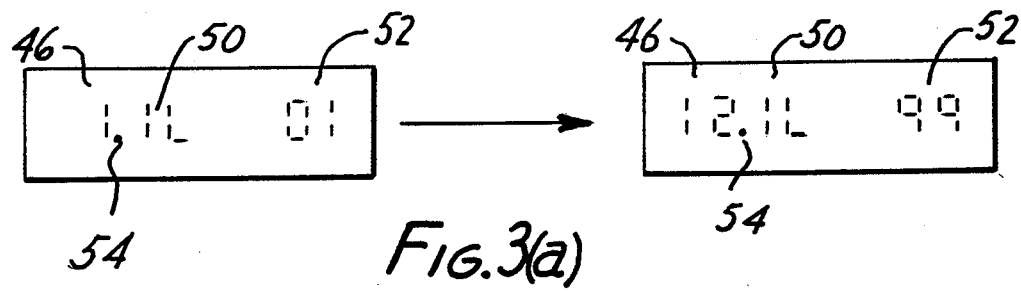
FIG. 3 illustrates the selective programming of a plurality of fertilizer or chemical injection devices.

Each of the three functions interval, delay, and application duration can be for any one of the stations selected by rotary switch 32. As illustrated in FIG. 3a for example, the interval function is selected by operation of switch 40 with the display showing the particular station selected by station select switch 32. With the interval function selected the field stations and the numerical value for the interval can be selected.

The programming of the interval function for stations 1-12 randomly selected by switch 32 is illustrated in FIG. 3(a). The first two digits at 46 show the field station 1-12 selected by switch 32. The second and third digits (IL) after dot 54 indicate that the interval function has been selected by function selection switch 40. The last two digits are changed by activation of switches 42 and 44 to select an injection interval of from 0 up to 99 cycles. That is, depending upon the particular program (i.e. additive) selected by select switch 20 the frequency of injection of that chemical is selected according to the numerical value displayed at 52. The one (1) at 52 indicates that the additive will be injected each time field number one is irrigated as selected by station select switch 32. This interval can be changed from 0 (no application) up to an interval of every 99th cycle. That is, for the display in the left hand portion of FIG. 3(a) field one will receive the preprogrammed additive each time the field is irrigated while at the right hand portion the display indicates that field 12 will only receive an injection of additive on every 99th interval or cycle. Programming of zero (0) at position 52 indicates that no application will activate regardless of all other function programs.

Figure 3B:
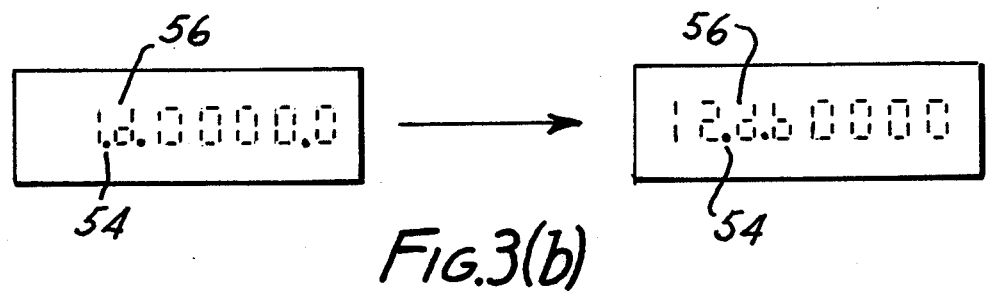

The delay time for the application or injection of a particular additive is illustrated in FIG. 3(b) again for field stations 1-12 selected by rotary switch 32. The characters preceding dot 54 indicate the fields selected while the dot illustrated at 56 indicates that the delay function has been selected. The delay is entered numerically by an operation of switches 42 and 44 and can be from 0 up to 6,000.0 minutes. Delay time resolution can be programmed in one-tenth of a minute (6 second) increments.

Figure 3C:
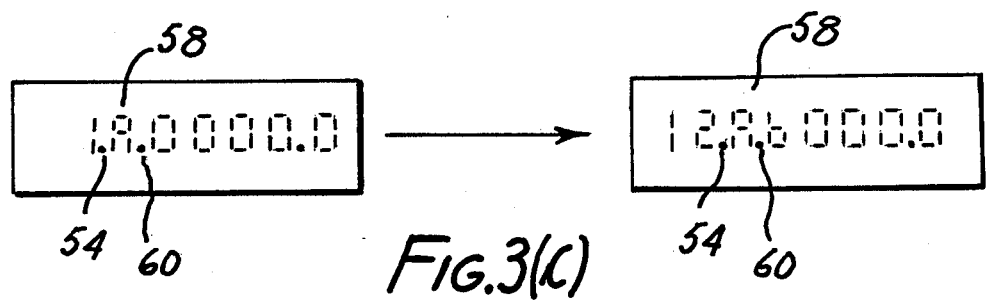

The period of time (i.e. apply) for application or injection of a particular additive is shown selected in FIG. 3(c). Again the digits to the left of dot 54 illustrate the field station selected by switch 32. The character A at 58 before the dot 60 indicates apply duration time function has been selected by function selection switch 40. The time period for injection of the fertilizer or chemical is selected again by alternate operation of pushbutton switches 42 and 44 to provide application from 0 to 6,000.0 minutes. Apply time resolution can be programmed in one-tenth of a minute (6 second) increments.

Switch 42 selects the particular digit in the display shown in FIG. 3a-3c that is being programmed while switch 44 increases that particular digit. Thus, when output status switch 18 is switched to the "hold all" or the programming position, the display will indicate the station selected by switch 32 and one of the functions selected by switch 40, interval, delay, or apply time. A previously entered program can be easily changed by simply rotating station select switch 32 to the station to be reprogrammed with function select switch being pushed until the particular function is selected. Switches 42 and 44 are then operated to enter modify the number of intervals or duration. When completed, output status switch 18 is then switched back to the "normal apply" position to place the system into operation.

Figure 3D:
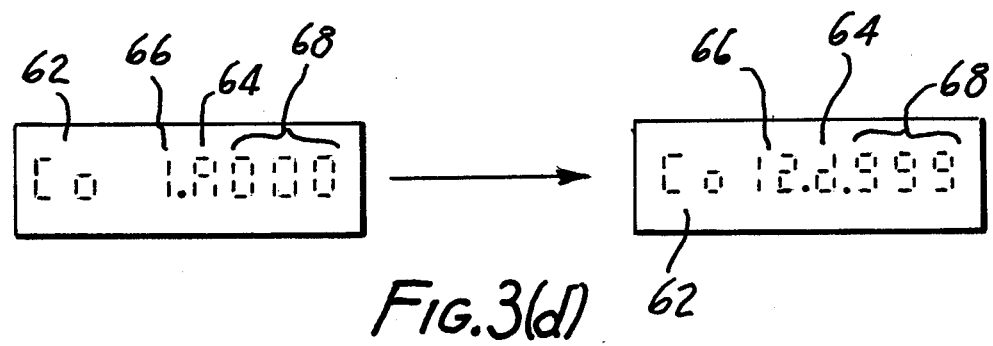

A desired feature of the invention is illustrated in FIG. 3d. The count feature is activated by selecting zero on station selection switch 32. The number of applications of the particular additive selected by switch 20, to a particular field will then be shown in the display. The characters CO at 62 indicates that the system is now in the count mode indicating the number of applications for each output program and each station. With station select switch at zero the output program is selected by switch 20 which is displayed at 64 on the display. Sequentially pressing function select switch 40 with station switch at 0 selects in sequence the stations indicated at 66 giving the number of counts or applications of that particular additive since last programmed or set to zero. Up to 99 applications can be counted before recycling.

The system can also report that a particular output (A, B, C or D) is currently active through a particular valve (1-12). With output status switch 18 in "normal apply", an active output will be reported by one or more lamps 24, 26, 28, 30 being illuminated indicating that output A, B, C or D is or are active. By rotating field station select switch 32 through positions 1-12, active field valves will be indicated by "Run" showing in display 46.

The system can also identify any program which has aborted or "faulted" for any reason. If a programmed application has faulted light 70 will be in a blinking mode to indicate there has been one or more programs which have aborted. The particular program that has aborted can be determined by positioning station select switch 32 to number 15. Function select switch 40 is then sequentially pressed to review each station. When the faulted station and program is discovered display 46 will show the station and the particular program that has faulted. Function select switch 40 must be sequenced to review all stations before the fault test will cancel and the system will return to normal operation. By recording the particular field station and programs that has faulted application adjustments can be made.

This invention is not to be limited by the embodiments shown in the drawings or described in the description which are given by way of example and not of limitation but only in accordance with the scope of the appended claims.

I claim:

1. An injection control system for selectively activating circuitry to control additive chemical injection into an existing automatically timed irrigation system having an irrigation timer comprising;

a plurality of storage means for storing one or more additives;

conduit means for delivering an additive from said plurality of storage means to conduit in said existing irrigation system;

a plurality of electrically activated valve means in said conduit means for delivering one or more of said additives selectively to said existing irrigation system;

injection control means for selectively controlling simultaneous injection one or more of said one or more additives from said plurality of storage means into said conduit means for mixing with water flowing through said existing irrigation system;

sensing means in said injection control means for sensing the opening and closing of valves in an existing irrigation system;

said injection control means including programmable central processing means programmed to read, count, and store in memory valve opening signals of said existing irrigation system; said programmable central processing means programmed to control operation of said electrically activated valve means and said injection control means to control activation, duration and cessation of additive injected into said existing irrigation during its operation;

whereby said injection control system controls the amount and duration of additive supplied to one or more fields during operation of an existing irrigation system.

2. The system according to claim 1 in which said sensing means includes electrical connecting means connecting said injection control means to said existing irrigation timer.

3. The system according to claim 2 which said storage means comprises a plurality of reservoirs for storing a plurality of additives; and electrically activated injection valve means connecting each of said plurality of reservoirs to said conduit means.

4. The system according to claim 3 in which said programmable central processing means selectively activates one or more of said injection valve means to inject one or more of said additives into said conduit means.

5. The system according to claim 4 in which said programmable central processing means includes means for programming the interval for injection of said additives into said conduit means.

6. The system according to claim 5 in which said programmable central processing means includes means for programming a predetermined delay before injection of said additive.

7. The system according to claim 6 in which said programmable central processing means includes means for programming the period of application of said additive.

8. The system according to claim 4 in which said programmable central processing means includes means for programming a predetermined delay before injection of said additives.

9. The system according to claim 4 in which said programmable central processing means includes means for programming the period of application of said treating chemical.

10. The system according to claim 4 including means for interrupting operation of said injection control means.

11. The system according to claim 10 in which said interrupting means includes means for selecting injection of an additive on the next irrigation cycle.

12. The system according to claim 11 in which said interrupting means comprises a three position switch to select normal, interrupt or next cycle for application of said additive.

* * * * *